Feb. 21, 1933.  A. C. ROWLEY  1,898,897
FUSIBLE FIXED TEMPERATURE RELEASE UNIT
Filed Aug. 26, 1930
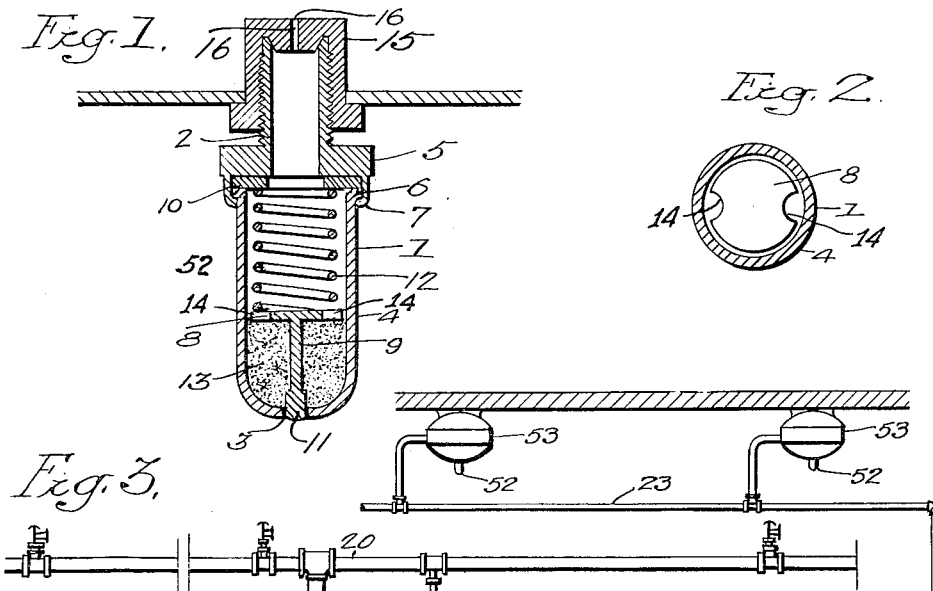
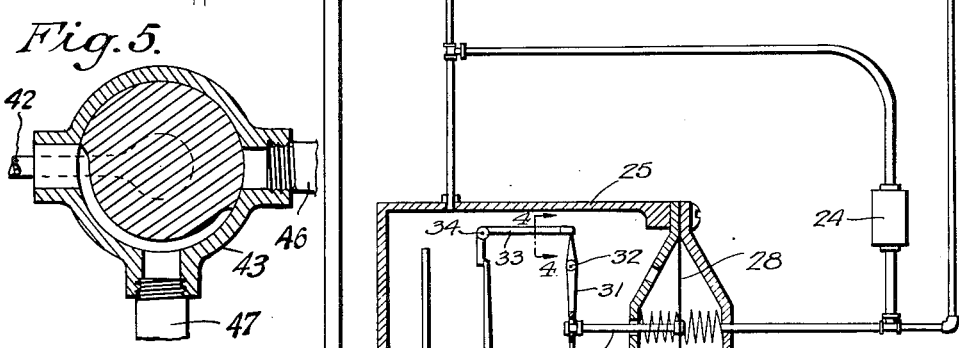
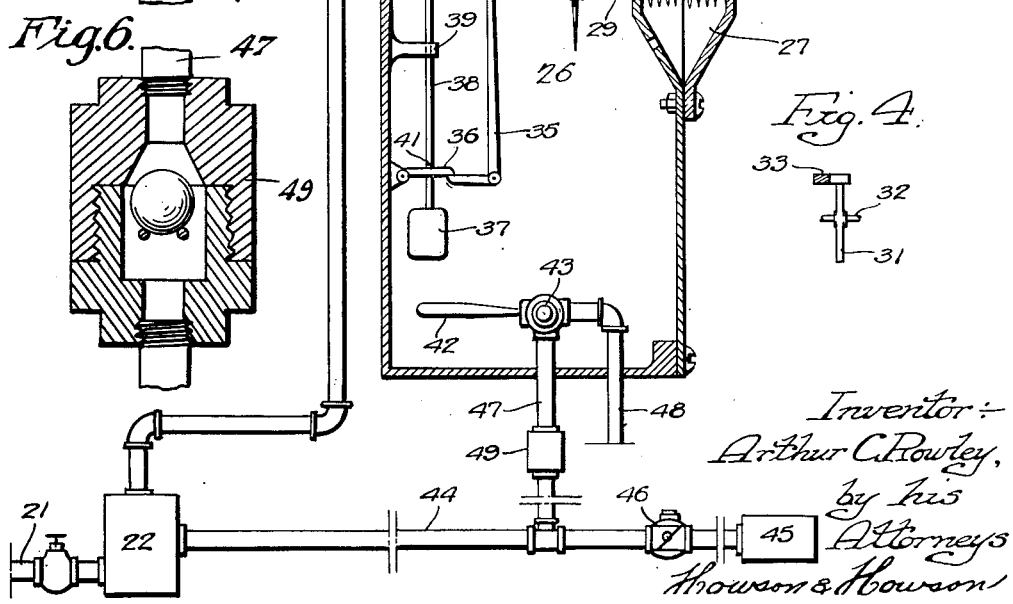
Inventor:-
Arthur C. Rowley,
by his
Attorneys
Howson & Howson Patented Feb. 21, 1933

1,898,897

UNITED STATES PATENT OFFICE

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA

FUSIBLE FIXED TEMPERATURE RELEASE UNIT

Application filed August 26, 1930. Serial No. 477,901.

This invention relates to improvements in thermally-actuated release devices, and a principal object of the invention is to provide a novel and desirable fusible venting unit for normally closed systems, useful, for example, for releasing stored up pressure in fire detection systems upon a predetermined rise in temperature within the zone in which said unit is installed, and adapted particularly to systems depending upon a sudden change of pressure for actuation of a diaphragm or the equivalent controlling operation of fluid discharge devices.

In the attached drawing:

Figure 1 is an enlarged longitudinal sectional view of a unit made in accordance with my invention;

Fig. 2 is a sectional view taken on the line 2—2, Fig. 1;

Fig. 3 is a diagrammatic view, illustrating a typical installation embodying my invention;

Fig. 4 is a section on the line 4—4 of Fig. 3;

Fig. 5 is a transverse sectional view showing a detail of the apparatus, and

Fig. 6 is a vertical sectional view showing the details of another element of the apparatus.

With reference to the drawing, my device in a preferred form comprises a casing 1 provided in the present instance with a hollow threaded extension 2 and having at the opposite end therefrom an aperture 3. In the present instance, the casing 1 consists of a cylindrical cup-shaped part 4, in one end of which is formed the opening 3, and a member 5 which carries the threaded extention 2 and which is united with the member 4 by means of interlocking flanges 6 and 7, as illustrated in Fig. 1, the flange 7 being beaded over and confining the flange 6 and retaining the parts together. At this joint a seal may be obtained by means of a gasket 10.

Within the cylindrical casing portion 4 is a plunger 8 having a stem 9 which extends downwardly and into the opening 3, said stem having an enlarged cylindrical extremity 11 which more or less neatly fills the aperture 3, while the remaining or inner portion of the stem is somewhat smaller in cross sectional area than the said aperture for a purpose hereinafter set forth. A spring 12 is confined between the inner face of the plunger 8 and the inner surface of the member 5 and exerts a pressure upon the plunger tending to force it towards the apertured end of the member 4.

In practice, the plunger is maintained in a position such as illustrated in Fig. 1 against the pressure of the spring by a solid body 13 of a suitable fusible compound, preferably of the character of alphamononitronaphthalene or the like which maintains its solid form substantially unchanged until the critical fusion temperature is reached. Sufficient of this material is placed in the casing 1 to support the plunger 8 in the position illustrated in Fig. 1, in which the enlarged stem portion 11 occupies a position in, and substantially closes, the aperture 3. The fusible material preferably is introduced into the container in a liquid state, and provision is made in the form of recesses 14 in the peripheral edge of the plunger 8 for permitting the liquid to enter the space at the outer end of the casing member 4, the enlargement 11 of the plunger stem preventing escape of the material while in the liquid state. The fusible material is then permitted to solidify, whereupon the parts are maintained in the relative positions illustrated until such time as excessive temperatures in the space surrounding the casing 1 result in a fusion of the composition, at which time the spring 12 functions to force the plunger outwardly. The initial movement of the plunger carries the enlargement 11 out of the aperture 3 and provides clearance, between the smaller portion of the stem 9 and the edges of the aperture 3, through which the fused material may escape. Escape of the material in this manner affords a free passage for a fluid through the casing 1.

In conjunction with the device described above, I employ a socket member 15 which may be secured by solder or by other suitable means in the wall of a chamber constituting a part of the normally closed system with which my device is to be used and which system may, for example, contain air or other fluid medium under a predetermined elevated pressure. The socket member 15 has an aperture 16 in its inner wall and is threaded for reception of the threaded projecting portion of the casing member 5 whereby the latter may be secured as illustrated in Fig. 1 with its interior communicating through the aperture 16 with the interior of the system.

In operation, the parts are maintained as illustrated, the fusible material 13 preventing escape of the fluid contents of the system to which the device is connected. Elevated temperatures in the space surrounding the casing 1 result in fusion of the substance 13 as described and subsequent escape thereof through the aperture 3, thereby affording a vent to the atmosphere from the interior of the system.

Following actuation of the device as described above, the casing 1 may be unthreaded from the socket 15 and replaced by a fresh unit adapted to operate as set forth above.

In Fig. 3 I have illustrated a typical system embodying my invention. With reference thereto, 20 indicates a sprinkler system which is connected to a water main 21 through a valve 22. This valve is of a type adapted to be held closed against water pressure in the main 21 by fluid pressure within the sprinkler system, and may take the form, for example, of the valve illustrated in my U. S. Patent No. 1,446,321, dated February 20, 1923. A detector system 23 is connected to the system 20 through a restricted orifice at 24, and this orifice also by-passes a casing 25, interior portions 26 and 27 of which, communicating respectively with the sprinkler and detector systems, are separated by a flexible diaphragm 28. The diaphragm is operatively connected through a rod 29 with a lever 31 pivotally mounted at 32 within the casing, and this lever in a predetermined normal position, as shown, is adapted to support upon its upper end one arm of a second lever 33, also pivotally mounted at 34, within the casing. The other arm of the lever 33 extends downwardly and functions as a latch to retain a third pivoted lever 35 in a position as shown in Fig. 3, in which it in turn supports a lever 36, and, through the latter, a weight 37. The weight is attached to the lower end of a rod 38 guided for vertical movement in an arm 39 in the casing, and the rod 38 has a shoulder 41 under which the lever 36 engages to retain the weight in the elevated position. With the parts as shown in Fig. 3, movement of the diaphragm 28 in either direction by reason of an unbalance of pressures in the chambers 26 and 27 will effect a release through the lever train 31—33—35—36 of the weight 37 which in dropping will strike an arm 42 and open a valve 43 connected thereto, for a purpose hereinafter set forth.

Connected with the system 20 through a pipe 44 is an air compressor 45. The pipe 44 includes a check valve 46, and a branch pipe 47 extends from the pipe 44 to the valve 43 within the casing 25. This valve 43, shown in Fig. 5 in alternative positions connects the branch 47 with the interior of the casing 25 and with a pipe 48 extending to the exterior of the casing and to atmosphere. A float valve 49 (see Fig. 6) controls the branch duct 47, as hereinafter set forth. When the valve 43 is open to the casing 25, the lever 42 occupies the position shown in Figs 3 and 5, and depression of the lever 42 by the weight 37 closes the valve to the casing and connects the pipe 47 to exhaust through the pipe 48.

In practice the two systems 20 and 23 are filled with air from the compressor 45 at a pressure somewhat above atmospheric, the pressures in the systems being equalized through the orifice 24. The valve 22 is held by this pressure to its seat cutting off the main 21, and the pressure permeates both of the chambers 26 and 27 and exerts equal pressures on opposite sides of the diaphragm. Springs 51, 51, insure a centralized position of the diaphragm, as shown. Under these conditions gradual relative changes in pressure in the systems are compensated without actuation of the diaphragm 28 by transfer through the orifice 24; but a sudden change in pressure beyond the compensating capacity of the orifice results in a movement of the diaphragm releasing the weight 37 and thereby operates the valve 43 to open the systems to exhaust through the pipe 48. Relief of pressure in the system 20 effects an immediate opening of the valve 22, thereby flooding the system, escape of water from the main through the exhaust 48 being prevented by the float valve 49.

In apparatus of this general character, a detector depending for operation entirely upon increase of pressure in the system is sometimes ineffective under slow-fire conditions, since the pressure must increase at a rate greater than can be compensated by flow through the orifice 24. Under such conditions installation in the detector system of the release units described above insure operation by venting the detector system at a predetermined abnormal temperature and thus creating the sudden pressure differential required for actuation of the diaphragm.

In accordance with my invention, therefore, and as shown in Fig. 3, I provide the detector system 23 with the fusible units described above, the units, designated by the reference numeral 52, being inserted in the present instance in the casings 53 forming parts of the system.

This fusible device is well adapted for use in that type of fire detection system, illustrated diagrammatically in Fig. 3, in which fluid discharge devices are actuated through movement of a flexible diaphragm effected by sudden release of pressure in a system with which said diaphragm is associated. The device in principle is suitable, however, not only for the relief of extra-atmospheric pressures within a normally closed system, but also for admission, under predetermined controlling temperature conditions, of air or other fluid to a normally closed system the internal pressure of which is lower than atmospheric. As regards the uses to which the device may be put, therefore, there is to be no limitation. As regards structural details, the device is capable of considerable modification without departure from the invention.

I claim:

1. In a fusible release unit, the combination with a casing having a port, a plunger in said casing having a part adapted to project into and substantially close said port, a fusible composition within said casing adapted in solid state to support the plunger in the port-closing position and to seal the said port, and in a fused state releasing said plunger for movement to a position permitting flow of the fused composition through said port, and a spring exerting a pressure to move the plunger to the said latter position upon fusion of said composition.

2. In a fusible release unit, the combination with a casing open at one end and having a restricted port at the other, of a plunger movably mounted in the casing and having a stem projecting into said port, said stem being of substantially lesser cross sectional area than the port and being enlarged in part to afford a substantial closure for said port, a spring tending to shift the plunger in the casing to a position in which said enlarged section clears the port thereby opening the latter, said plunger being adapted to be supported in the port-closing position by a fusible compound in the solid state, and being released for actuation by the spring when the compound is fused.

3. In a fusible release unit, a housing having an aperture, a closure for said aperture, resilient means tending to shift the closure into an inoperative position with respect to said aperture, and a fusible composition in solid state normally retaining the closure in the operative position.

4. A fusible release unit comprising a casing having a port, a closure for said port adapted to be retained in a port-closing position by a solidified fusible composition mounted within the casing and adapted to escape from the casing in a fused condition when said closure is moved to port-opening position, and a spring operative when the composition is fused to shift the closure to a port-opening position.

5. In a fusible release unit, the combination with a cylindrical housing having a port, a plunger movably mounted within the housing and having a stem projecting into and closing said port, said stem having a portion of materially lesser cross-sectional area than the port, a fusible composition in solid state confined between the plunger and the ported portion of the housing and retaining the plunger in the port-closing position, and a spring acting on said plunger to place the fusible composition under pressure whereby when the said composition is fused the spring actuates the plunger first to bring the portion thereof of lesser area into the port, thereby opening the latter, and then to expel the fused composition from the housing.

6. In a fusible release unit, the combination with a cylindrical housing having a port, a plunger movably mounted within the housing and having a stem projecting into and closing said port, said plunger including means effective in an adjusted position of the plunger for affording a passage from the interior of the housing through the port, a fusible composition in solid state confined between the plunger and the ported portion of the housing and retaining the plunger in the port-closing position, a spring acting on said plunger to place the fusible composition under pressure whereby when the said composition is fused the spring actuates the plunger to said adjusted position, and thereafter to expel the fused composition from the housing, and openings in said plunger affording communication between the said port and the interior of the housing.

ARTHUR C. ROWLEY.